Feb. 17, 1942.  F. F. HAFEMEISTER  2,273,571
PIPE HANGER
Filed Nov. 23, 1938  3 Sheets-Sheet 2
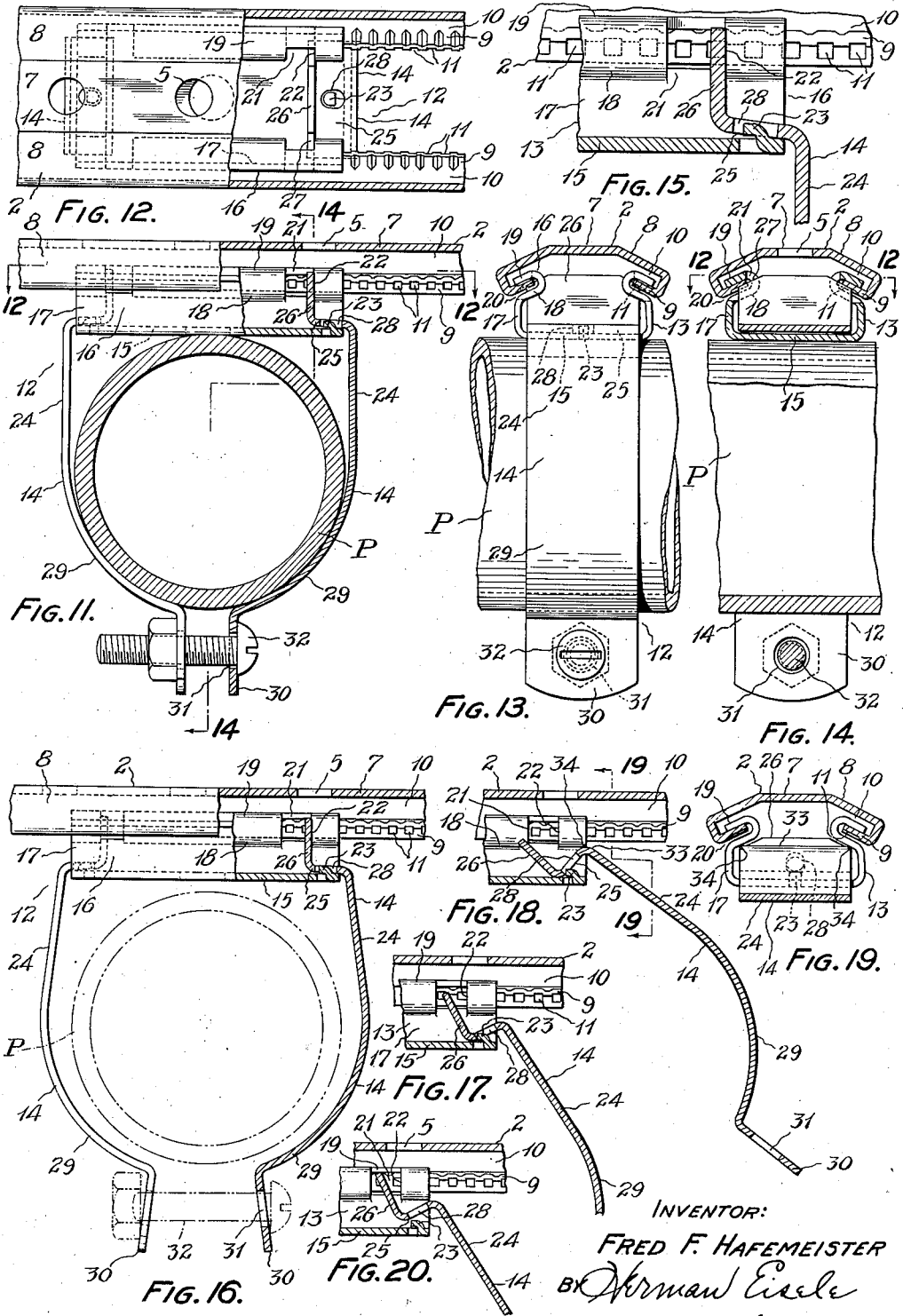
INVENTOR:
FRED F. HAFEMEISTER
BY Norman Eiele
ATTORNEY

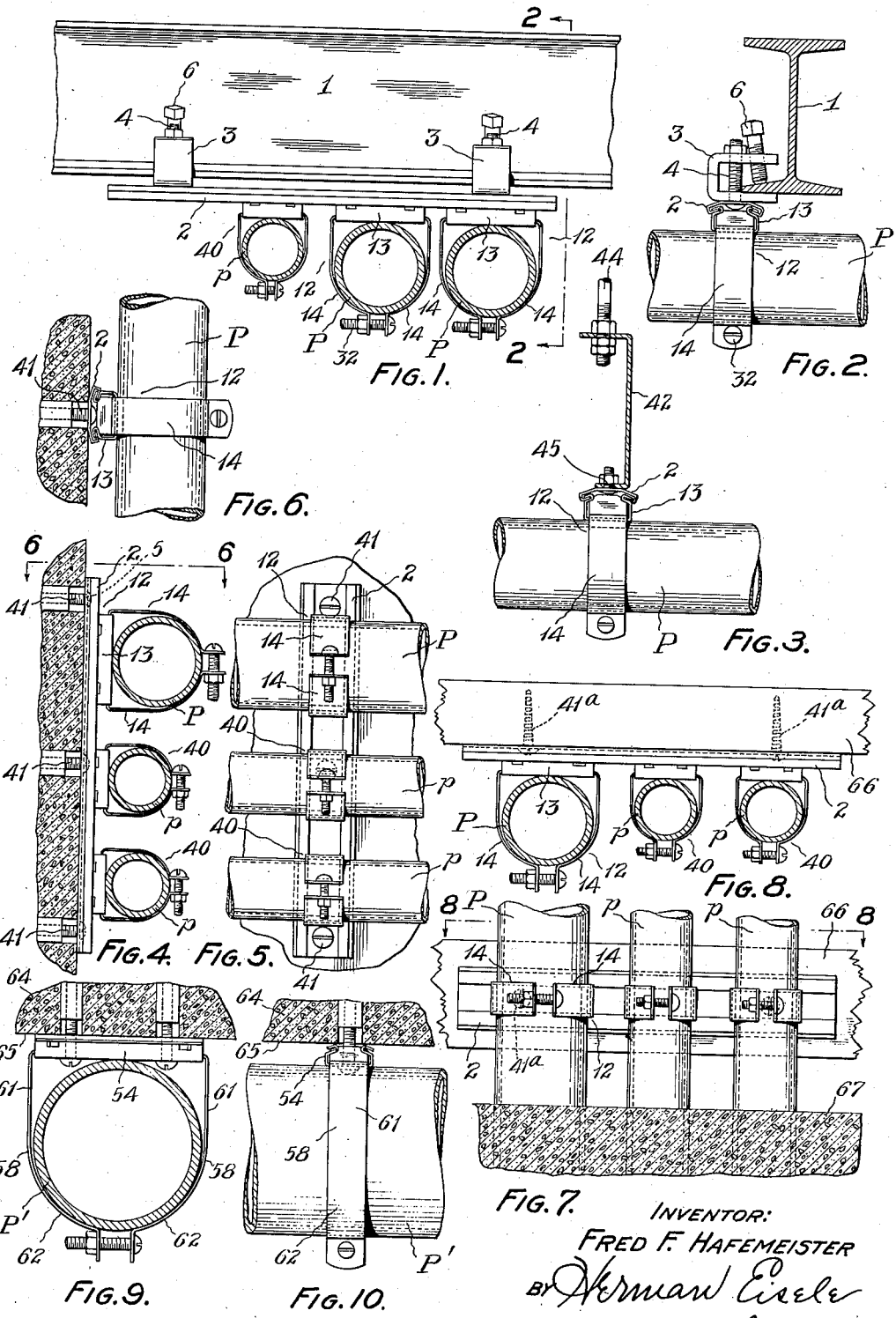

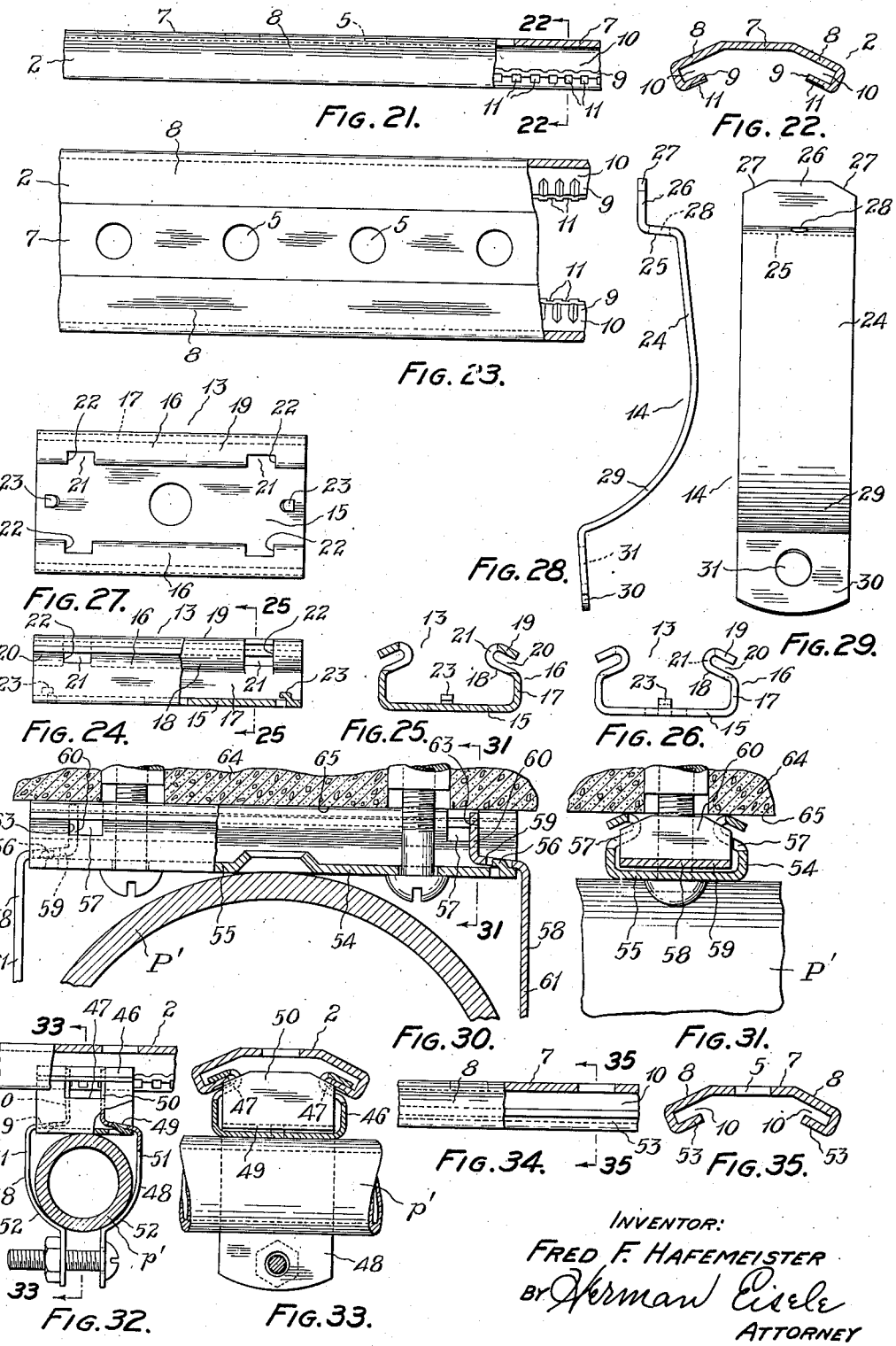

Patented Feb. 17, 1942

2,273,571

UNITED STATES PATENT OFFICE 2,273,571

PIPE HANGER

Fred F. Hafemeister, Cleveland Heights, Ohio, assignor to The Cleveland Switchboard Company, Cleveland, Ohio, a corporation of Ohio Application November 23, 1938, Serial No. 241,893

13 Claims. (Cl. 248—62)

This invention relates to devices for hanging or supporting conduits, pipes, tubes, rods and the like, from the roofs, ceilings or walls of buildings or from other structures.

More specifically this invention relates to a hanger construction which includes the use of a plurality of pipe holders shiftably mounted on a fixed rail and which is particularly well adapted for the support of banks of electric wire conduits.

It is a general object of this invention to provide a device of this class which is light in weight, strong in construction, neat in appearance, economical to manufacture and easy to install.

It is a further object of this invention to produce a construction of this class which has a maximum of flexibility in respect to the location of conduits or pipes relatively to each other and relatively to the supporting structure, and which will readily permit the re-spacing or re-arranging of the conduits after installation and which will permit the installation of additional or substitute conduits from time to time after completion of the original installation.

It is a further object of this invention to produce a device of this class in which the conduits may be more closely spaced than has been possible with previously used devices.

It is a further object of this invention to produce a construction of this type which can readily be adapted to accommodate a large range of sizes of conduits.

It is a further object of this invention to produce a construction of this class which can be used for the support of the conduits in a horizontal or vertical position and which can be used to support banks of conduits arranged in a horizontal plane as well as banks of conduits arranged in a vertical plane.

It is a further specific object of this invention to produce a device of this class in which the tightening of one screw coincidently binds the conduit in the holder and the holder in its desired position on the rail.

It is a further specific object of this invention to produce a rail and associated parts which readily permit the shifting of the conduit and which provide locking means adapted to positively hold the conduit fixed to the rail.

It is a further specific object of this invention to provide a mounting for a removable pipe, including a clamp arm which can be swung to an open or pipe receiving position without becoming disengaged from the parts on which the arm is mounted.

It is a further specific object of this invention to produce a pipe hanger having a pair of complementary straps or hanger arms each adapted to be tightened against one side of the conduit and having a portion extending into and interlocked with the structure in which it is supported or from which it is suspended.

Further objects and advantages of this invention will appear from the following description and from reference to the accompanying drawings. These annexed drawings and description set forth in detail certain means embodying this invention, such disclosed means constituting however, but a few of the forms in which the principles of this invention may be applied.

In said annexed drawings:

Fig. 1 illustrates this improved hanger construction supporting a plurality of horizontal conduits of different sizes spaced from each other and arranged in a substantially horizontal plane, including a plurality of the hanger or holder units supported in a section of an improved rail which is in turn mounted on a structural I beam by means of spaced beam clamps, this view being an elevation of the hanger structure and supporting beam.

Fig. 2 is a transverse view taken from the plane indicated by line 2, 2 in Fig. 1, showing this improved hanger structure in end elevation.

Fig. 3 is a transverse view similar to Fig. 2 showing a modified type of mounting including a channel substituted for the I beam and clamp of Fig. 2.

Fig. 4 illustrates this improved hanger construction applied to the support of a plurality of horizontal conduits of various sizes which are spaced from each other and arranged in a substantially vertical plane, including a plurality of hanger or holder units supported in a section of the rail which is in turn mounted on a vertical wall, this view being an end elevation of the hanger structure.

Fig. 5 is a front elevation of the parts shown in Fig. 4.

Fig. 6 is a plan view of the parts shown in Fig. 4, taken from the plane indicated by line 6, 6, in that figure.

Fig. 7 shows this improved hanger construction supporting a plurality of vertical conduits including a plurality of holder units supported in a section of rail which is horizontally mounted on a vertical wall near the floor, which floor is presumed to be poured after the conduits have been fixed in proper spaced relation by the hanger construction shown.

Fig. 8 is a plan sectional view of the parts shown in Fig. 7 taken from the plane indicated by the line 8, 8 in said figure.

Fig. 9 shows a hanger unit mounted directly upon a supporting structure without the use of an interposed rail.

Fig. 10 is a side view of the parts shown in Fig. 9.

Fig. 11 is an enlarged view of a portion of Fig. 1, partly in side elevation and partly in section showing one of the hanger or holder units and a portion of the supporting rail, these parts being shown in the position in which the conduit is clamped in the hanger unit and in which the hanger unit is fixed to the rail.

Fig. 12 is a plan view partly in section, of the parts shown in Fig. 11, this view being taken on the planes indicated by lines 12, 12 in Figures 11 and 14.

Fig. 13 is a side elevation of the parts shown in Fig. 11.

Fig. 14 is a fragmentary vertical transverse sectional view taken on the plane indicated by line 14, 14 in Fig. 11.

Fig. 15 is an enlarged view of a portion of Fig. 11.

Fig. 16 is a view similar to Fig. 11 showing the parts, however, in an intermediate stage in which the hanger arms have been advanced into clamping engagement with the rail but prior to the clamping engagement of the arms with the conduit.

Fig. 17 is a fragmentary view similar to a portion of Fig. 16 showing an intermediate position which is assumed by the upper end of the arm when the lower end of the arm is swung outwardly to permit the insertion of the conduit or the lateral adjustment of the base member, after the base member of the hanger unit has been tentatively positioned on the rail.

Fig. 18 is another fragmentary view showing the position assumed by the hanger arm when it is moved to the extreme outward position permitted by the configuration of the parts.

Fig. 19 is an end view taken on the plane indicated by the line 19, 19 in Fig. 18.

Fig. 20 is a fragmentary view similar to Fig. 17 showing the position of the hanger arm in which it may be inserted into or removed from the base member of the hanger unit.

Fig. 21 is a side elevation, partly in section, of a fragmentary portion of the rail which constitutes an essential element of this improved hanger construction.

Fig. 22 is a transverse section thru the rail taken on the plane indicated by line 22, 22 in Fig. 21.

Fig. 23 is a plan view partly in section, of the rail shown in Fig. 21.

Fig. 24 is a side elevation partly in section of the base member, detached, this base member forming one of the essential elements of the hanger unit or holder of this invention.

Fig. 25 is a transverse section thru the base member taken on the plane indicated by line 25, 25 in Fig. 24.

Fig. 26 is an end view of the base member shown in Fig. 24.

Fig. 27 is a top plan view of the base member shown in Fig. 24.

Fig. 28 is a detached side elevation of one of the hanger arms of this improved hanger unit or holder.

Fig. 29 is a side elevation of the hanger arm shown in Fig. 28.

Fig. 30 is an enlarged view, partly in section, of the upper portion of the hanger unit illustrated in Fig. 9.

Fig. 31 is a transverse sectional view taken on the plane indicated by line 31, 31 in Fig. 30.

Fig. 32 is a view similar to Fig. 11 illustrating a hanger unit constructed in accordance with this invention, adapted for supporting a relatively very small size of pipe or conduit.

Fig. 33 is a transverse sectional view of the structure shown in Fig. 32 and taken on the plane indicated by line 33, 33 in said figure.

Fig. 34 is a fragmentary view of a modified form of rail omitting certain notches or recesses embodied in the preferred form of rail.

Fig. 35 is a section on line 35, 35 of the rail shown in Fig. 34.

It will be evident from an inspection of the drawings that this improved hanger construction may be suspended from an overhead structure, or may be supported on a vertical wall, or may, in fact, be mounted at any angle. In order to facilitate the description of this hanger construction and its component parts, the position of the parts with relation to each other, and the direction in which certain elements extend or project, will be described with reference to the position and directions which these parts assume in Figures 11 and 13 in which the hanger construction is suspended from, and hangs downwardly from, a beam and in which the hanger unit supports a horizontally disposed conduit.

This invention will be therefore first described with reference to the assembled detailed illustration of the hanger construction as shown in Figures 11 to 14 and as shown in Figures 1 and 2 where this hanger construction including a plurality of the hanger units, is illustrated in relation to the supporting structure, and as shown in Figures 21 to 29, which illustrate essential parts of this hanger detached from the assembly.

In these views, I indicates a supporting beam which may constitute any portion of a building or structure and which, for purposes of illustration, is shown as an I-beam. Disposed below one flange of the I-beam I, is a rail 2 which, in the embodiment shown, is removably secured to a pair of beam clamps 3 by means of bolts 4, passing thru suitable apertures 5 in the rail. The clamps 3 may be removably secured to the beam flange by set screws 6, as shown.

The rail 2 is preferably made of continuous strip metal and is cut to lengths to suit the requirements of the installation. This rail comprises a central web portion 7, downwardly and outwardly inclined side web portions 8, and reversely bent flanges 9 which are substantially parallel to and spaced from the web portions 8, whereby opposed inwardly and upwardly opening grooves 10 are formed, the web portions 8, the flanges 9, and the grooves 10 being disposed transversely with reference to the axis of the pipe. The lower faces of the flanges 9 are preferably formed with regularly spaced teeth and recesses or notches 11, adapted to serve as detents for a purpose which will appear. The central web portion is formed with the apertures 5 preferably at regularly spaced intervals to receive the supporting bolts 4, or any other suitable means for mounting the rail upon the supporting structure.

Suspended from and adjustably mounted on the rail is a hanger unit or pipe holder indicated generally at 12. This holder includes a base member 13 slidably interlocked with the flanges 9 of the rail 2, and a pair of hangers or clamp arms 14 depending from the base member adjacent the ends thereof. The base member is preferably formed of continuous strip metal of satisfactory gauge and is cut to lengths to suit the size of the pipe or conduit which is intended to be supported by the hanger unit. In fact, for reasons which will become apparent, the length of the base member is preferably made substantially the same as the outside diameter of the pipe P to be supported.

This base member is generally channel shaped in cross section and comprises a substantially horizontal bottom web 15 and flange conformations 16 extending upwardly from the web. These flanges extend upwardly substantially at right angles from the plane of the web as indicated at 17 whereupon they are bent into inwardly and upwardly projecting flange portions 18. The walls of the flange portions then terminate in reversely bent outwardly and downwardly inclined flanges 19 parallel to and spaced from the flange portions 18, whereby downwardly and outwardly opening grooves 20 are formed between the flanges 19 and the portions 18, the flange conformation 16 being disposed transversely with reference to the axis of the pipe.

The thickness of the flanges 9 and the width of the grooves 20 and the thickness of the flanges 19 and the width of the grooves 10, respectively, and the angles at which these parts are disposed, are so selected and these parts are otherwise so located that the flanges 19 of the base member rest in easy sliding engagement upon the flanges 9 of the rail 2.

The inwardly and upwardly projecting flange portions 18 are preferably formed with rectangular recesses or apertures indicated at 21. These apertures are located adjacent but spaced from the ends of the base members and form an inwardly directed abutment indicated at 22 and disposed transversely of the flange conformations.

The base member 13 is further formed, in any desired manner, with an upwardly directed projection 23 preferably substantially centrally of the web, adjacent but spaced from each end of the web.

The base member 13 is further formed with one or more apertures intersecting the web 15 which may be used for securing the base member to a support when this base member is used independently of the rail. This aperture may also be used to anchor a supporting rod for certain special constructions with which this base member may be utilized.

The two hanger or clamp arms 14 of each pair are preferably identical in form and made of strip metal of a suitable gauge, strength and elasticity. The arms are shaped to conform to the contour of the size of pipe or conduit P which the hanger arms are intended to support and clamp.

The hanger arms are each formed intermediate their ends with a substantially straight side portion 24, at the upper end of which the arm is formed with a substantially right angularly bent portion forming a shoulder or seat 25 adapted to seat or rest upon the end of the web 15 on the base member 13. Inwardly of the seat 25 the metal of the arm is again bent right angularly and substantially parallel to the side portion 24, to form a lip or tongue 26 extending upwardly toward the reversely bent flanges 9 on the rail 2 and intersecting the recesses 21 on the base member 13. When the hanger arms are in a pipe clamping position as shown in Figures 11 and 14, the upper edges of the lips 26 are in actual engagement with the flanges 9 and/or notches 11. In order to provide parallel bearing surfaces against the flange 9, the upper edges of the lips are preferably beveled on each side as shown at 27, in order to effect a larger area of contact between the lip and the flange.

The shoulder or seat portion 25 is formed with an aperture 28 preferably larger than the upwardly directed projection 23 and located to register with this projection when the upper edge of the straight side portions 24 of the hanger arm substantially engages the end of the web 15 of the base member.

The straight side portion 24 of the hanger arm is preferably made substantially equal in length to the radius of the pipe P to be supported. Continuing from the lower end of this straight side portion, the metal of the arm is formed to substantially the same curvature as the outside of the pipe, this curved portion being indicated at 29. The curved portions 29 of the two arms are made somewhat shorter in length than that required to encompass the pipe, when the pipe is clamped, as appears in Fig. 11. The lower ends of these curved portions terminate in a substantially right angularly bent flange 30, as shown in Figures 11 and 28. This flange is formed with an aperture 31, for receiving a bolt or other screw member 32, which is adapted to draw the depending portions of the hanger arms together in order to effect a clamping of the pipe and to coincidently effect a locking of the hanger unit on the rail, as will be explained.

As will appear from an inspection of Fig. 13, the width of the strip metal used for making the arms is slightly less than, but approximates the width of the space between the upwardly extending flanges 17 on the base member 13, the flanges 17 thus serving as side guides for the hanger arms.

The above described rails 2 and hanger units 12 may be mounted on various types of supports and may be arranged in various positions and, in addition to the mounting shown in Figures 1 and 2, various other mountings and positions of these parts are illustrated in Figures 3 to 8, in which like reference characters indicate similar parts. As will also be understood, the hanger units may also be made in various sizes to accommodate different pipe sizes and, for purposes of illustration, hanger units, indicated generally at 40, are shown for supporting a relatively smaller pipe p, in Figures 1 to 8.

*Installation*

The use, method of installing, and advantages of this improved pipe and conduit hanger construction will be understood by reference to Figures 1 to 8 inclusive, each of which illustrates this construction with a plurality of the hanger units assembled in various positions and angles, and by reference to Figures 11 to 15 which, in enlarged views, illustrate the hanger parts in assembled position and by reference to Figures 16 to 20 which illustrate the hanger parts in several partly assembled positions.

Figures 1 to 8 each illustrate two sizes of hanger units or holders assembled in one rail, the larger units supporting the pipes P and being assumed to be identical with the unit shown enlarged in Figures 11 to 20 and indicated generally at 12 in Figures 1 to 8 and smaller units for supporting the relatively smaller pipes $p$ and indicated generally at 40.

In the erection of this improved hanger construction preparatory to the installation of banks of conduits or pipes, rails 2 of suitable lengths are first supported in properly spaced positions on the structure which is intended to carry the conduits or pipes. The means used for supporting the rail depends on the type of support to which this rail is to be attached. In Figures 1 and 2, the rail 2 is shown to be supported by a pair of bolts 4 mounted in beam clamps which may in turn be fixed in any position on a flange of a structural member, thus avoiding the necessity of drilling holes in the supporting member.

In Figures 4 to 8 the rail 2 is shown to be supported on walls by means of a plurality of anchor bolts 41 or screws 41a passing thru the holes 5. As will appear from the drawings, the openings 5 in the web are spaced relatively closely in order that supports for the rail may be provided selectively at the most advantageous positions with relation to the ends of the rail.

When no satisfactory support is available at the elevation at which it is desired to locate the conduits, channels such as shown at 42 may be suspended from the ceiling or other convenient overhead structure by means of rods 44 fragmentarily shown in Fig. 3. The channel 42 may be provided with a plurality of holes 45 in its lower flange, registering with the holes 5 in the rail in order to permit bolts to be passed thru as many registering holes as appears desirable.

After the rail 2 has been supported in the desired position, one or more base members 13, of the size best adapted for the conduit to be supported, are mounted on the rail in sliding engagement therewith, the flanges 19 entering the grooves 10 and resting on the flanges 9 of the rail. Each base member 13 is tentatively placed in the approximate position which it is intended to occupy. The upper end of a hanger arm 14 is then inserted into the open end of the base member and seated upon the web 15 in a position in which the aperture 28 is intersected by the upwardly directed projection 23. This is readily effected in the manner suggested in Fig. 20 accompanied, if necessary, by a slight turning or dipping motion to thread the tongue 26 into the recess 21. The upper end of a second hanger arm 14 is then inserted in the opposite open end of the base member.

At this stage of the installation, the two arms hang loosely from the base member somewhat in the position shown in full lines in Fig. 16, from which it will appear that the upper end of the lip or tongue 26 is in engagement with the bottom face of the flanges 9, being held in this position by gravity. A slight longitudinal shifting of the base member on the rail will cause the lip 26 of at least one of the arms 14 to nest in one of the recesses or notches 11 formed on the bottom faces of the flange 9. The engagement of the lip or lips with the notches normally tends to prevent accidental movement of the base member in the rail; however, the base member and arms may readily be manipulated to permit any desired adjustment of the base member longitudinally of the rail.

The hanger unit is now ready to receive the pipe or conduit P and, in order that the pipe may be introduced between the hanger arms one or both of the hanger arms may readily be manually swung laterally about the seat 25 and the projection 23 on the web 15 as a pivot. From an inspection of Fig. 17 it will be apparent that any lateral swinging of the bottom of the hanger arm will not cause the upper end of the arm to disengage from the base member 13 due to the interlocking between the aperture 28 on the arm 14 and the projection 23 on the web 15. In Figures 18 and 19 is shown the position of an arm 14, after it has been swung to its extreme outward position in which the outer projecting corner 33 formed at the intersection of the seat 25 and the straight side portion 24 engages the outer ends of the flange portions 18 as indicated at 34. Even in this position, as will appear, the projection 23 prevents the removal of the arm from the base member 13. It will be evident therefore, that, as long as any portion of the seat 25 rests upon the web 15 with the projection 23 intersecting the opening 28, the arm 14 cannot be removed from the base portion, regardless of the angle of the arm. It will also be evident that the lifting of the arm from the base portion so that the arm clears the projection 23 will readily permit the removal of the arm, as will appear from an inspection of Fig. 20.

After the bottoms of the arms have been sufficiently spread apart to receive the pipe or conduit P, the pipe is moved into the desired position as shown for instance in Fig. 16 and is temporarily supported in any convenient manner. The base member 13 may then be slightly readjusted manually to suit the exact location of the pipe, after which the arms 14 are readily brought together manually until the lip 26 engages one of the recesses or notches 11 on the under side of the flanges 9, as a result of which the base member is firmly locked to the rail. A bolt or similar screw means 32 may then be inserted thru the two alined apertures 31 in the arms 14 and this bolt may then be used to advance the two flanges 30 toward each other causing the curved portions 29 to engage the under sides of the pipe P and eventually to force the pipe upwardly into engagement with the bottom of the web 15 on the base member 13 as will appear from Fig. 11.

It will be clear that the bending or deflection of the lower portions of the arms 14 from the position shown in Fig. 16 into the pipe clamping position shown in Fig. 11, will cause the lip 26 to press more tightly into engagement with the flange 9 and with the recesses or notches 11, impelled by the resilience of the deflected portion of the side portions of the arms. It will further be evident that the hanger arms are in effect only levers, pivotally mounted adjacent the ends of the base members, having their long lever arm depending and having the short lever arm projecting laterally upward and terminating in the lip 26 by which arrangement a very high intensity of stress is readily obtained between the lip and the flange 9, thus insuring a firm clamping or fixing of the base member on the rail. It will also be apparent that the advancing of the lower portions of the arms toward each other tends to draw the upper ends of the arms outwardly about the side of the pipe as a fulcrum, thus causing the upper end of the lip 26 to engage the inwardly directed abutment 22 as shown in Figures 11 and 15, thus providing a support for the lip on the base member immediately adjacent the engagement of the lip with the notches in the rail.

After one pipe or conduit has been located and clamped in the desired position on the rail, additional hanger units or holders may be inserted and located in the rail and the additional pipes clamped in a manner similar to that just described, one or all of which may be holders of sizes different from the first installed holder, such for instance as the smaller hanger units 40 shown in Figures 1 to 8 used for supporting the pipes or conduits *p*.

Altho Figures 1 to 8 each show only three hanger units of only two different sizes, assembled on a section of rail, any number of hanger units or any number of combinations of sizes of hanger units may be mounted on one rail, limited only by the size, length and capacity of the rail; and it is also evident that hanger units may be replaced or additional hanger units may be added at any time.

Figures 11 to 20 illustrate one intermediate size of hanger unit. It will be evident that hanger units made according to this invention may be produced for supporting any size of pipe or conduit without departing in any important respect from the type of construction shown and different sizes of hanger units for supporting pipes and conduits ranging in size from ½" to 4" have in fact been manufactured and satisfactorily installed adjacent each other on the same rails.

For purposes of illustration, a small size of hanger unit for supporting a smaller size of pipe or conduit *p'*, is illustrated in Figures 32 and 33 which is substantially identical in construction with the large hanger units except that the base member 46, due to its shorter length is preferably provided with only a single recess 47 on each side corresponding to the recesses 21 shown in the base member 13 illustrated in Figures 11 to 20. The rail 2 is identical with that previously described and the channel shaped base member 46 is accordingly formed with grooves and flanges adapted to interlock in free sliding engagement with the rail 2. The hanger arms 48 shown in Figures 32 and 33 while they are lighter in gauge have shoulders or seats 49 and lips 50 of substantially the same contour as the hanger arms 14. Likewise the width of the arms 48 is preferably substantially identical with the width of the arms 14. The straight side portions 51 and the lower curved portions 52, of course, are made smaller to accommodate the smaller diameter of pipe for which this hanger is intended.

For many types of installations the notches or recesses 11 formed in the flanges 6 of the rail 2 are especially advantageous, as for instance, when the rail is mounted in a vertical position as shown in Fig. 4 where the notches most effectively prevent the longitudinal unintentional shifting of the holders even when the pipe or conduits are heavily loaded. In some installations, however, the notches are not absolutely essential as for instance when this hanger construction is used for supporting light conduits from horizontally disposed rails where the resiliently actuated pressure with which the lip 26 is forced against the flange 6 is amply sufficient to maintain the hanger unit in place.

Such a rail without notches is illustrated in Figures 34 and 35 where the reversely bent flanges 53 are plain and relatively smooth on their under faces but where the rail conforms in all other respects to the rail previously described.

The rail 2 is not an essential element in every use of the hanger unit or holder herein described. Figures 9 and 10 for instance illustrate an individual hanger unit, of a relatively larger size, mounted directly against the ceiling or other support 64 by means of a pair of spaced screws as clearly shown in Fig. 9 as well as in the enlarged views of a portion of this hanger shown in Figures 30 and 31. This hanger unit consists of the generally channel shaped base member 54 which is provided with flange and groove conformations as described in connection with the base member 13 in order that this hanger may, interchangeably with other base members, be slidably mounted in the rail 2. As shown, the base member 54 is provided with a web 55 and upward projections 56 adjacent the ends of the web. This base member 54 is further provided with recesses 57 adjacent to and spaced substantially the same distance from the ends of the base member as the recesses 21 are spaced from the ends of the base members 13. As will appear from Fig. 31, this base member, due to the heavier load imposed upon this size of base member, is preferably made of a slightly heavier gauge material than that used for the base member 13.

The hanger arms 58 in this relatively larger hanger unit are provided adjacent the upper ends with shoulders or seats 59 and lips 60 substantially identical in conformation with the seats and lips in the arms previously described. The straight sides 61 and the curved lower ends 62 of these arms are necessarily made to conform to the larger size of pipe P' which is to be supported in these arms. The gauge of the material from which the arms are made is also necessarily slightly heavier due to the heavier load to be carried by the arms, altho the arms are preferably made of the same width of material as that used for the previously described arms.

As will appear from an inspection of Figures 30 and 31, the upper edge of the lip 60 is very closely adjacent but spaced from the lower face 65 of the support 64 to which this hanger unit is attached, thus permitting ample freedom of swinging movement of the arms 58 during assembling. It will also be evident that the upper end of the lip 60 on the hanger arm firmly engages the inwardly directed abutment 63 formed on the base member 54 when the screw means advances the lower ends of the arms into clamping engagement with the pipe.

It will also be understood that in some installations, only one of the improved hanger or clamp arms herein described may be necessary in each hanger unit, the other arms being fixed to the base member or of any other desired construction.

It will further be clear that the supporting member upon which this improved hanger construction is mounted may be either stationary or movable; also, altho the above described mountings have been presumed to be of a permanent nature, this hanger construction is well adapted for use and re-use as a temporary pipe support. One such temporary use is illustrated in Figures 7 and 8 in which this hanger construction is used for supporting a plurality of vertical conduits in spaced relation on a suitable temporary support 66 prior to the pouring of a concrete floor 67 in which the conduits are to be imbedded, in order that the conduits may be held rigidly in a predetermined position while the concrete is being poured.

It will be evident from the drawings, and description, that this improved hanger construction embodies the objects set forth at the beginning of these specifications.

As previously pointed out, this improved hanger construction may be used in a position suspended from an overhead structure as illustrated, for instance, in Fig. 11 and Fig. 13, or it may be used to support a pipe on a vertical wall or may be positioned at any angle. For the purpose of defining this invention specifically in the claims the parts of this structure are assumed to be oriented as illustrated in Figures 11 and 13, and accordingly the term "upward" used in the claims is to be interpreted to indicate a direction toward the supporting structure and away from the supported pipe and the term "lower" is intended to indicate a position on that side of the pipe opposed to the base member.

It is to be understood that this invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the claims to the exact construction shown and described.

What I claim is:

1. In a device for supporting a pipe or the like from a structure, in combination a base member, means for securing the base member to the structure, the base member comprising a web and upwardly extending flanges disposed transversely with reference to the axis of the pipe, at least one of said flanges being formed with an abutment spaced from the web and projecting inwardly from and transversely of the flange, a hanger arm tiltably mounted on the base member and adapted to engage the pipe, an extension formed on said arm adapted to engage said abutment when the arm is in the pipe engaging position, and screw means adapted to advance the arm into engagement with the pipe.

2. In a device for supporting a pipe or the like from a structure, in combination, a base member, means for securing the base member to the structure, the base member being generally channel shaped in cross section and comprising a web, upwardly extending side guides, and an abutment spaced from the web and spaced from the end of the base member and projecting inwardly from and transversely of one of said guides, a hanger arm tiltably mounted on the base member and between said guides, said arm being formed with a seat adapted to engage the pipe and provided with an extension adapted to engage said abutment when the seat in in the pipe engaging position, and means adapted to advance the seat into pipe engaging position.

3. In a device for supporting a pipe or the like from a structure, in combination, a base member, means for securing the base member to the structure, the base member being generally channel shaped in cross section and comprising a web and upwardly extending flanges, at least one of said flanges being formed with an inwardly projecting abutment spaced from the web, a pair of opposed hanger arms adapted to clamp the pipe pivotally mounted on the base member adjacent the ends of said base member, said hanger arms being made of strip metal slightly less in width than the space between the said flanges, at least one of the hanger arms being formed with a shoulder adapted to seat on the web between said flanges whereby the arm is laterally positioned by the flanges, said arm being formed with an extension adapted to engage the abutment when the arm is in the pipe clamping position, and screw means adapted to advance the arm into clamping engagement with the pipe.

4. In a device for supporting a pipe or the like from a structure, in combination, a base member, means for securing the base member to the structure, the base member being formed of strip metal and generally channel shaped in cross section and comprising a web, upwardly extending flange portions, inwardly and upwardly inclined flange portions, and reversely bent downwardly and outwardly inclined flanges parallel to the inwardly and upwardly inclined flange portions, a recess being provided in the inwardly and upwardly inclined flange portion forming an abutment, a pair of hanger arms disposed on opposite sides of the pipe, an extension on at least one of the hanger arms adapted to engage said abutment when the arm is in the pipe clamping position, and screw means adapted to advance the arms into clamping engagement with the pipe.

5. In a hanger for supporting a pipe or the like from a structure, in combination, a base member, means for securing the base member to the structure, and a hanger arm removably mounted on the base member, the base member being generally channel shaped in cross section and comprising longitudinally extending web and flange portions, the arm being formed with a seat portion adapted to engage the web between the flange portions, the web portion and the seat portion being formed with interengaging shoulder means independent of the flange portions adapted to prevent the removal of the arm from the base member in a longitudinal direction when the seat is in engagement with the web.

6. In a hanger for supporting a pipe or the like from a structure in combination, a base member, means for securing the base member to the structure, and a hanger arm removably mounted on the base member, the base member being generally channel shaped in cross section and comprising a web and flange portions, the arms being formed with a seat portion adapted to engage the web between the flange portions, the seat of the hanger arm being formed with an aperture and the web portion being formed adjacent the end of the base member with an upwardly projecting shoulder extending into the aperture, whereby the edge of the aperture prevents the removal of the arm in a longitudinal direction, from the base member when the seat is in engagement with the web.

7. A pipe hanger adapted to be supported on a structure comprising a generally channel shaped base member formed with a web and flange portions, means for securing said base member to the structure, a pair of opposed hanger arms mounted on the base member, the hanger arms each being formed adjacent their lower ends with a portion adapted to seat the pipe and at least one of said arms being formed near its upper end with an offset adapted to seat upon the said web adjacent the end of the base member, and interengaging shoulder means formed on the web portion and on the hanger arm adapted to prevent the disenagement of the hanger arm from the base member when the hanger arm is depending from the web, and screw means adapted to advance the lower ends of the arms toward each other.

8. A pipe hanger adapted to be supported on a structure, comprising a base member formed with a web and side guide portions, means for securing said base member to the structure, a pair of opposed hanger arms pivotally mounted between the side guide portions and depending from the base member, said depending portions being formed with areas intermediate their upper and lower ends adapted to engage the sides of the pipe, an inwardly directed abutment formed on the base member adapted to be engaged by the upper end of one of the hanger arms, and screw means associated with the lower ends of the said depending portions adapted to force the said areas against the sides of the pipe and tending to rotate said one hanger arm about the pipe and to firmly engage the upper end of said one arm with the abutment.

9. In a pipe hanger construction the combination of a rail, a base member slidably mounted on the rail, a pair of hanger arms depending from and pivotally mounted adjacent their upper ends on said base member and screw means adapted to advance the lower ends of the arms toward each other, the upper end of at least one of said arms being formed with a lip movable about said pivotal mounting adapted to engage the rail in clamping relation when the screw means is actuated, whereby said base is clamped in position relatively to the rail.

10. In a pipe hanger construction the combination of a rail, a base member slidably mounted on the rail, a pair of hanger arms pivotally supported adjacent their upper ends on said base member and depending from the base member, screw means adapted to advance the lower ends of the arms toward each other, the upper end of at least one of said arms being formed with a lip movable about said pivotal support adapted to engage the rail when the screw means is actuated, the depending arm including a relatively resilient portion, whereby the lip is resiliently engaged with the rail, when the screw means has advanced the lower ends of the arms to their terminal position.

11. In a pipe hanger construction, the combination of a rail, a base member slidably mounted on the rail, a pair of hanger arms depending from and pivotally mounted adjacent their upper ends on said base member, and screw means adapted to advance the lower ends of the arms toward each other, and to rotate at least one of the arms about the pivotal mounting, the rail being formed with spaced notches, the upper end of said rotatable arm being formed with a lip adapted to intersect the said notches on the rail when the screw means is actuated, whereby said base is fixedly clamped in position relatively to the rail.

12. In a pipe hanger construction, the combination of a rail comprising a central web portion and lateral inturned flanges forming opposed inwardly open grooves, a base member generally channel shaped in cross section and comprising a web portion and a pair of flanges slidably disposed in the said grooves, a pair of hanger arms pivotally supported on the base member and formed with portions adapted to engage a pipe disposed below said base member, at least one of said arms being formed with a lip adapted to engage the flange on the rail and screw means associated with the arms adapted to coincidently engage the said lip with the said flange and the lower ends of the arms with the pipe.

13. In a pipe hanger construction, the combination of a rail, a base member slidably mounted on the rail, a pair of hanger arms pivotally supported adjacent the ends of said base member and formed with portions adapted, when the arms are advanced toward each other, to frictionally engage opposed areas on the under side of a pipe disposed below said base member and to move the pipe into frictional engagement with the base member, screw means for simultaneously advancing said portions toward each other, the upper end of at least one of said arms being formed with a lip adapted to engage the rail in clamping relation when the screw means has advanced the said portions into engagement with the pipe sufficiently to move the pipe into frictional engagement with the base, whereby the screw means coincidently effects the clamping of the base member to the rail and the clamping of the pipe to the base member.

FRED F. HAFEMEISTER.